United States Patent [19]

Sanderson et al.

[11] Patent Number: 4,528,396
[45] Date of Patent: Jul. 9, 1985

[54] DICYCLOPENTADIENE DERIVED ESTER COMPOUNDS

[75] Inventors: John R. Sanderson; Lewis W. Watts, Jr., both of Austin, Tex.

[73] Assignee: Texaco Inc., White Plains, N.Y.

[21] Appl. No.: 423,412

[22] Filed: Sep. 24, 1982

[51] Int. Cl.$^3$ .............................................. C08K 5/12
[52] U.S. Cl. ..................................... 560/256; 524/311; 560/126; 560/231; 548/513
[58] Field of Search ............... 548/513; 560/126, 256, 560/231

[56] References Cited

U.S. PATENT DOCUMENTS

| | | | |
|---|---|---|---|
| 2,395,452 | 2/1946 | Bruson | 560/256 |
| 2,497,408 | 2/1950 | Gresham | 260/497 |
| 2,864,680 | 12/1958 | Degginger | 560/256 |
| 2,912,447 | 11/1959 | Brannock | 560/256 |
| 3,239,539 | 3/1966 | Bartlett et al. | 560/256 |
| 3,250,815 | 5/1966 | Houlihan | 560/256 |
| 3,403,175 | 9/1968 | Wolgemuth | 260/497 |
| 3,453,189 | 7/1969 | Brownstein | 204/72 |
| 3,479,395 | 11/1969 | Huguet | 260/497 |
| 3,542,857 | 11/1970 | Lutz | 260/497 |
| 3,558,689 | 1/1971 | Dunkel | 560/256 |
| 3,668,239 | 6/1972 | Kollar | 260/497 R |
| 3,770,813 | 11/1973 | Kollar | 260/497 R |
| 3,789,065 | 1/1974 | Kollar | 260/497 R |
| 3,907,874 | 9/1975 | Harvey et al. | 260/497 R |
| 4,045,477 | 8/1977 | Sherwin et al. | 260/497 R |
| 4,061,868 | 12/1977 | Fumagalli et al. | 560/246 |
| 4,069,381 | 1/1978 | Gaenzler et al. | 560/1 |
| 4,154,957 | 5/1979 | Neri et al. | 560/246 |
| 4,220,800 | 9/1980 | Stapp | 560/246 |
| 4,221,916 | 9/1980 | Stapp | 560/243 |
| 4,238,624 | 12/1980 | Morris et al. | 560/246 |
| 4,239,911 | 12/1980 | Weitz et al. | 560/246 |

FOREIGN PATENT DOCUMENTS

| | | |
|---|---|---|
| 1353814 | 7/1971 | United Kingdom . |
| 1326219 | 8/1973 | United Kingdom . |
| 0333166 | 7/1972 | U.S.S.R. ............... 548/513 |

OTHER PUBLICATIONS

A. Batog et al, Chem. Abstracts 95:114435n, (1981).

Primary Examiner—Nicholas S. Rizzo
Attorney, Agent, or Firm—Robert A. Kulason; Jack H. Park; Kenneth R. Priem

[57] ABSTRACT

Novel cyclic di- and tetraester compounds made from the reaction of various unsaturated cyclic compounds with carboxylic acid anhydrides in the presence of oxygen are described. The process to make these novel ester compounds is preferably conducted at a temperature in the range from about 50° to 150° C. and in the presence of a catalyst. A transition metal borate catalyst is preferred. Such ester compounds are potentially useful plasticizers, lubricants, solvents and fuel additives.

1 Claim, No Drawings

DICYCLOPENTADIENE DERIVED ESTER COMPOUNDS

CROSS-REFERENCE TO RELATED APPLICATION

This application is related to patent application Ser. No. 402,664, filed July 28, 1982, which relates to the production of alkane acetates from alkenes using transition metal borate catalysts.

This application is also related to patent application Ser. No. 423,413, filed of even date, concerning other novel cyclic ester compounds.

BACKGROUND OF THE INVENTION

1. Field of the Invention

The invention is related to novel ester compounds, and is particularly related to novel cyclic ester compounds having two or more ester functionalities.

2. Description of Methods and Compounds Relevant to the Invention

Various esters, also known as acetates, have been made by a number of different methods, many of which use olefins as the starting material. For example, U.S. Pat. No. 2,497,408 suggests the production of propylene glycol diacetate from propylene, oxygen and acetic acid over a metal acetate catalyst in which the metal is lead or iron in combination with an alkali earth metal acetate. Another example of this approach is U.S. Pat. No. 3,403,175 where olefins in oxygen are reacted in the presence of a reaction medium consisting of carboxylic acid and anhydrides with no catalyst to produce glycol diesters. Acyloxy compounds may be produced by the reaction of olefins with the metal salt of a carboxylic acid in an aqueous solution if electric current is passed through the solution, according to the method of U.S. Pat. No. 3,453,189. U.S. Pat. No. 3,479,395 reveals that olefins in oxygen may be converted to glycols and glycol acetates by being brought into contact with a solution comprising tellurium dioxide, an alkali metal halide and a redox agent dissolved in a solvent of certain specifications (water, acetic acid, dioxane, dialkyl formamides or dialkyl sulfoxides).

Further examples include U.S. Pat. No. 3,542,857 where vicinal glycol monoesters and diesters may be made by passing olefins in oxygen in an alkanoic acid medium over cerium salts. A method for making glycol esters from olefins and oxygen in a carboxylic acid medium over tellurium and an appropriate form of bromine is revealed in U.S. Pat. No. 3,668,239. Further, British Pat. No. 1,326,219 discloses that glycol esters may be produced from olefins and oxygen in the presence of at least one carboxylic acid when a halogen is employed as an anion and a metal cation is present which is selected from the group of tellurium, cerium, antimony, manganese, arsenic or cobalt. Other examples which reveal how esters may be made from olefins include U.S. Pat. No. 3,770,813 where an olefin with a chloro, hydroxy or lower alkanoyloxy substituent together with oxygen and a monobasic carboxylic acid may be reacted together over an iodide anion and a heavy metal cation of atomic numbers 21 to 30 and 48, and nitrogen-containing cations to give glycol esters. Olefins and oxygen may be reacted together over a catalyst system comprising a metal cation of tellurium, cerium, antimony, vanadium, gallium, arsenic, copper, selenium or silver with a bromine or chlorine anion to produce vicinal glycol esters which are later fractionated to give a residue with a boiling point higher than the vicinal glycol esters according to the disclosure in U.S. Pat. No. 3,789,065. The residue is then contacted with a carboxylic acid to yield additional vicinal glycol esters. British Pat. No. 1,353,814 describes the reaction of olefins and oxygen in a carboxylic acid in the liquid phase that contains at least 0.5 percent water over a catalyst system identical to that of the patent previously described to also yield vicinal glycol esters. Ethylene or propylene may be reacted with oxygen in a carboxylic acid over a catalyst system comprising a tellurium cation and a bromide anion or a selenium cation plus a chloride or bromide anion to produce vicinal glycol esters as revealed in U.S. Pat. No. 3,907,874.

Aliphatic hydrocarbon carboxylic acid esters of vicinal glycols which contain organic halogen impurities may be purified by passing them over aquobasic alkali metal compounds, aquobasic earth metal compounds or compounds (other than halides) of zinc, lead, cadmium, tin, mercury, silver, manganese, copper, nickel, cobalt, iron or chromium in accordance with the invention in British Pat. No. 1,410,834.

A system which has obtained a fair amount of commercial importance is described in U.S. Pat. No. 4,045,477 by which vicinal hydroxy esters and diesters are produced from olefins and oxygen over tellurium and an iodide source. Organic monoesters of vicinal glycols may also be produced from olefins, oxygen, water and a carboxylic acid over a system comprising an iodine compound (such as copper iodide, manganese iodide or cerium iodide), a copper compound, and an activated ion taken from the group of manganese, cerium, alkali metals, alkali earth metals, nitric compounds or mixtures thereof, according to the invention in U.S. Pat. No. 4,061,868. U.S. Pat. No. 4,069,381 reveals how glycol monoesters may be made from olefins, oxygen and carboxylic acids over a catalyst system where the cation is zirconium, niobium, molybdenum, hafnium, tantalum, tungsten or rhenium where the anion is a halide in the presence of lithium, sodium, potassium, titanium, vanadium, chromium, manganese, iron, cobalt, nickel, copper, zinc, aluminum or silver.

Some of the more recent patents in this field include the following. Esters may be produced from olefins in an acid plus oxygen over a tin or cerium catalyst in the presence of iodide as revealed by U.S. Pat. No. 4,154,957. Saturated vicinal esters may be produced from olefins, carboxylic acids and oxygen in the presence of a boron-containing catalyst according to the invention of U.S. Pat. No. 4,220,800. U.S. Pat. No. 4,221,916 teaches that olefins, carboxylic acids and oxygen when reacted together over a vanadium or ruthenium-containing catalyst can also produce saturated vicinal esters. U.S. Pat. No. 4,238,624 discloses a procedure by which ethylene, oxygen and a lower alkanoic acid are reacted together over an iodine source in a bismuth stabilized tellurium oxide catalyst on a carbon support to give ethylene glycol mono- and dialkanoates.

Further, alkylene glycol dicarboxalates may be made from carboxylic acid esters of monohydric or polyhydric short chain alcohols and olefins and oxygen over a catalyst system comprising tellurium, cerium, antimony, manganese, vanadium, gallium, arsenic or cobalt, plus a halogen anion and a hydrolyzing agent in addition to water as taught by U.S. Pat. No. 4,239,911.

No citations have been found to ester compounds similar to those disclosed herein.

SUMMARY OF THE INVENTION

The invention concerns novel cyclic compounds having the formula

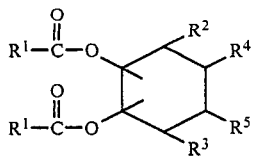
(I)

where $R^1$ is a lower alkyl group of one to four carbon atoms; $R^2$ and $R^3$ when taken singly are each hydrogen, or when taken jointly are a single methylene group; and $R^4$ and $R^5$, when taken singly, one is hydrogen and the other is selected from the group consisting of —CH=CH$_2$ and —CHR$^6$—CH$_2$R$^6$ where $R^6$ is

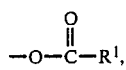

or one of either $R^4$ or $R^5$ is

and the other is

or, when taken jointly, $R^4$ and $R^5$ are a single moiety selected from the group consisting of

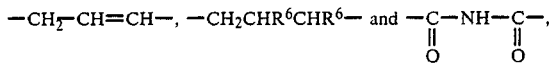

where $R^1$ and $R^6$ are defined as above.

DETAILED DESCRIPTION OF THE PREFERRED EMBODIMENTS

Novel cyclic ester compounds of formula (I) may be prepared by the oxygen or air oxidation of unsaturated cyclic materials in the presence of a carboxylic acid anhydride. The novel ester compounds of this invention may be represented by formula (I) where $R^1$ through $R^6$ are defined as noted. These ester compounds may serve as useful plasticizers, lubricants, solvents and fuel additives.

The feedstocks used to make the novel cyclic esters of this invention may have the formula

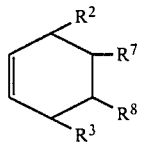
(II)

where again $R^2$ and $R^3$, when taken singly, are each hydrogen, or, when taken jointly, are together a single methylene group, also represented by —CH$_2$—. Substituents $R^7$ and $R^8$, when taken singly, one may be hydrogen while the other is —CH=CH$_2$. If $R^7$ and $R^8$ are taken jointly, they may represent a moiety taken from the group consisting of

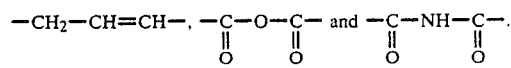

Generally, the unsaturated cyclic reactants should have from about 6 to 12 carbon atoms and at least one double bond. Some of the novel cyclic ester compounds of this invention must be made from compounds having two double bonds.

One feedstock used to make the novel ester compounds of this invention is cis-4-tetrahydrophthalimide, which has the empirical formula of $C_8H_8O_2NH$ and the structural formula of

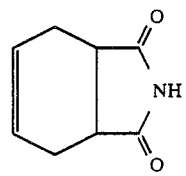
(III)

The compound cis-4-tetrahydrophthalimide may be made by a well known two-step process. In the first step, butadiene is reacted with maleic anhydride to produce cis-4-tetrahydrophthalic anhydride via Diels-Alder reaction. The anhydride is then aminated to give the imide of formula (III).

Dicyclopentadiene is another useful starting material for some of the novel esters of this invention. It has the empirical formula of $C_{10}H_{12}$ and the structural formula of

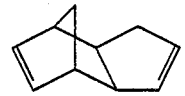
(IV)

Another appropriate feedstock is cis-1,2,3,6-tetrahydrophthalic anhydride which has the empirical formula of $C_8H_8O_3$ and the structural formula of

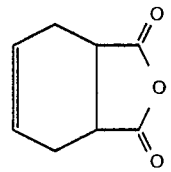
(V)

Cyclic olefins containing vinyl groups also yield novel esters when used as the feedstock. 4-vinyl-1-cyclohexene has the empirical formula of $C_8H_{12}$ and the structural formula of

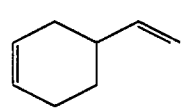
(VI)

A second essential co-reactant is a carboxylic acid anhydride having the formula

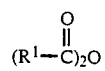

where $R^1$ is a lower alkyl group of 1 to 4 carbon atoms. It is preferred that $R^1$ be an alkyl of from 1 to 3 carbon atoms, especially methyl.

Of course, molecular oxygen in a pure form or air is an essential co-reactant for the method of this invention. While the reaction would occur with the application of heat alone, without a catalyst, it is preferred that a catalyst be employed. It is especially preferred that the catalyst be a metal borate compound such as an alkali metal borate, an alkali earth metal borate or a transition metal borate. Specific examples of transition metal borates, which are particularly preferred, include nickel borate, copper borate and iron borate. If a catalyst is employed, it should range from about 0.04 to 0.2 weight percent of the combined anhydride and cyclic olefin.

The reaction conditions under which the method for preparing the compounds of this invention may be conducted include a temperature range of from 50° to 150° C. The pressure may be one atmosphere or higher. These conditions are much milder than many of the esterification reactions in the prior art discussed earlier. The mole ratio of anhydride to cyclic olefin should range from about 2:1 or more. An excess is preferable. A mole ratio of 4:1 or more should be used if a tetraester is the desired result when a feedstock containing two double bonds is employed, such as when the feedstock contains a vinyl group in addition to one in the ring. Mixtures of these esters can also be created by using a mixture of anhydrides. Indeed, an ester reaction mixture is the typical product from this oxidation of olefins in anhydride. Structure (I) represents only one component of this reaction mixture.

The invention will be further illustrated by the following examples.

EXAMPLE 1

The reactant cis-4-tetrahydrophthalimide (15.1 g, 0.10 mole), 60 ml of acetic anhydride and 0.10 g of nickel borate were placed in a 100 ml resin flask equipped with a mechanical stirrer, a water-cooled condenser and a fritted glass addition tube and thermometer. The mixture was heated to 90° C. and air bubbled through the reaction mixture at 50 ml/minute. The temperature was maintained at 90±2° C. by means of a Thermo-O-Watch temperature regulator. After 21 hours the reaction mixture was poured into an equal volume of water and stirred until all of the acetic anhydride had hydrolyzed. The viscous oil was taken up in methylene chloride and washed three times with an equal volume of water. The methylene chloride solution was dried over sodium sulfate and removed on a rotary evaporator. An infrared spectrum of the residue indicated a strong C=O band (due to ester) at about 5.8 microns as well as the amide band at about 6 microns. Nuclear magnetic resonance analysis indicated that about 17% of the mixture was the ester imide. The ester imide would have the structure of formula (I) where $R^1$ is methyl, $R^2$ and $R^3$ are both hydrogen and $R^4$ and $R^5$ together are —CONHCO—. The rest of the mixture consisted of the imide of formula (III) and minor unidentified products.

In the next examples, Examples 2-4, the novel esters will have the structure of formula (I) where $R^1$ is methyl or propyl, $R^2$ and $R^3$ together form a methylene bridge and $R^4$ and $R^5$ together are —CH$_2$CHCH— or —CH$_2$CHR$^6$CHR$^6$—. Esters of the formula

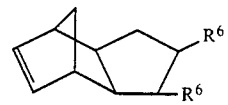

(VII)

would not be unexpected.

EXAMPLE 2

A resin flask was equipped with a condenser, mechanical stirrer, fritted glass addition tube and thermometer. Fifty ml of acetic anhydride, 20 ml of dicyclopentadiene and 0.032 g of nickel borate were introduced into the flask and the mixture heated to 100° C. The temperature was maintained at 100° C.±2° C. by means of a Thermo-O-Watch temperature controller. Air was bubbled through the reaction mixture for 20.3 hours at 50-60 ml/minute. The mixture was then cooled to room temperature and poured into an equal volume of water. The solution was shaken or stirred until all of the acetic anhydride had hydrolyzed. The oil was taken up in methylene chloride and the acetic acid/water discarded. The methylene chloride solution was washed twice more with an equal volume of water and dried over anhydrous sodium sulfate. The methylene chloride was removed on a rotary evaporator (water pump) to yield a thick, brown oil. An infrared spectrum indicated a strong band at 5.8 microns (neat). Nuclear magnetic resonance analysis indicated the absence of starting material. A saponification value indicated 76% ester was formed (the value for the tetrafunctional ester was taken as theoretical).

EXAMPLE 3

The procedure was the same as that for Example 2 except that 0.110 g of nickel borate was used and propionic anhydride was substituted for acetic anhydride. A saponification value indicated 82% tetrafunctional ester. Thus, tetraesters where $R^1$ has the designation of a lower alkyl of one to three carbon atoms may be readily produced.

EXAMPLE 4

To begin, cis-1,2,3,6-tetrahydrophthalic anhydride (15.3 g, 0.01 moles), 50 ml of acetic anhydride and 0.10 g of nickel borate were placed in a 100 ml resin flask equipped with a water cooled condenser, a mechanical stirrer, a fritted glass addition tube and a thermometer. The mixture was heated to 110° C. and air bubbled through at 50-60 ml/min for 22 hours. The temperature was maintained at 110±2° C. by means of a Thermo-O-Watch temperature regulator. The acetic anhydride was distilled out and the residue refluxed for 6 hours with 50 ml of methanol. The excess methanol was then distilled out and the residue heated for several hours at 70°-80° C. under (6-7 mm Hg) vacuum. The residue was a viscous oil.

Infrared analysis indicated a strong ester function and strong carbon-hydrogen bands as in acetate functions. The spectrum also indicated a strong band indicative of a carboxylic acid. Analysis by NMR indicated major bands typical of —COOCH$_3$ and —COCH$_3$ groups. There was no indication of starting material. Thus, the novel ester resulting from this example had the probable structure of formula (I) where $R^1$ is mwethyl, $R^2$ and $R^3$ are both hydrogen, and $R^4$ is —COOH and $R^5$ is —COOCH$_3$. To make novel esters of this particular type, besides the feedstock cis-1,2,3,6-tetrahydrophthalic anhydride, an alcoholic reactant of the formula $R^1$OH must be employed after the reaction with oxygen and the carboxylic acid anhydride. In this example, the $R^1$ was methyl, the alcohol being methanol.

Examples 5-8 which follow use 4-vinyl-1-cyclohexene as the primary feedstock. Two novel products result, a diacetate and a tetraacetate. The diacetate will be of formula (I) where $R^1$ is methyl, both $R^2$ and $R^3$ are hydrogen and $R^4$ is —CH=CH$_2$ and $R^5$ is hydrogen. The tetraacetate is essentially the same except that $R^4$ is —CHR$^6$—CH$_2$R$^6$ where $R^6$ is —OCOR$^1$ where $R^1$ is again methyl.

EXAMPLE 5

A small resin flask was fitted with a thermometer, mechanical stirrer, fritted glass addition tube and water cooled condenser. 4-vinyl-1-cyclohexene inhibited with p-tert-butyl catechol (25 ml), acetic anhydride (70 ml) and nickel borate (0.10 g) were charged to the flask and the contents heated to 110° C. Air was bubbled through the flask and the contents heated to 110° C. Air was bubbled through the flask at 40-50 ml/min for 23.5 hours. The temperature was maintained at 110° C.±2° C. by means of a Thermo-O-Watch temperature regulator. The mixture was poured into water and shaken until the acetic anhydride had hydrolyzed. The aqueous layer was then drawn off and discarded. The organic layer was washed three times with water and dried over anhydrous sodium sulfate.

An infrared spectrum of the reaction mixture showed a strong band at 5.77 microns (C=O) and a weak band at 6.1 microns (C=CH$_2$). Nuclear magnetic resonance analysis indicated that the reaction mixture was about 70% 4-vinyl-1-cyclohexene, about 10% diacetate and about 13% tetraacetate.

EXAMPLE 6

The reaction conditions, etc. were essentially the same as Example 6 except that 4-vinyl-1-cyclohexene was treated with silica gel to remove the inhibitor. Infrared analysis showed a strong band at 5.78 microns (C=O) with a shoulder at about 6.1 microns (C=CH$_2$). Nuclear magnetic resonance analysis gave the following results: 30% 4-vinyl-1-cyclohexene, 40% diacetate and 16% tetraacetate.

EXAMPLE 7

The reaction conditions, etc. were essentially the same as Example 7 except that the temperature was lowered to 100° C. Infrared analysis showed a strong band at 5.77 microns (C=) and a bond at about 6.1 microns (C=CH$_2$). Nuclear magnetic resonance analysis gave the following results: 85% 4-vinyl-1-cyclohexene, 10% diacetate and 5% tetraacetate.

EXAMPLE 8

A somewhat different starting material, 4-vinyl cyclohexene dioxide (99% pure from Aldrich Chemical Co., 15 g), 50 ml of acetic anhydride and 0.1 g of NaOH were placed in a 100 ml round bottomed flask and refluxed for 4-5 hours. The reaction mixture was then poured into water and shaken until all of the acetic anhydride had hydrolyzed. The aqueous layer was withdrawn and discarded and the organic layer washed three times with water. The organic layer was then dried over anhydrous sodium sulfate. An infrared spectrum showed a very strong band at 5.77 microns (C=O). There was no OH indicated. By nuclear magnetic resonance analysis, the sample contained 79% of the tetraacetate.

We claim:
1. Dicyclopentadiene derived ester compounds having the formula

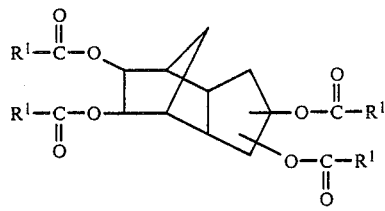

where $R^1$ is a lower alkyl of 1 to 4 carbon atoms.

* * * * *